(12) United States Patent
Koc et al.

(10) Patent No.: US 9,215,701 B2
(45) Date of Patent: Dec. 15, 2015

(54) RANDOM ACCESS CHANNEL ENHANCEMENTS FOR LTE DEVICES

(71) Applicants: Ali Taha Koc, Hillsboro, OR (US); Umesh Phuyal, Hillsboro, OR (US)

(72) Inventors: Ali Taha Koc, Hillsboro, OR (US); Umesh Phuyal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 13/629,928

(22) Filed: Sep. 28, 2012

(65) Prior Publication Data

US 2013/0242735 A1  Sep. 19, 2013

Related U.S. Application Data

(60) Provisional application No. 61/612,188, filed on Mar. 16, 2012.

(51) Int. Cl.
| | |
|---|---|
| *G01R 31/08* | (2006.01) |
| *H04W 72/04* | (2009.01) |
| *H04W 72/08* | (2009.01) |
| *H04W 52/02* | (2009.01) |
| *H04L 5/14* | (2006.01) |
| *H04W 72/12* | (2009.01) |
| *H04W 76/04* | (2009.01) |

(Continued)

(52) U.S. Cl.
CPC ......... *H04W 72/0413* (2013.01); *H04L 1/1896* (2013.01); *H04L 5/0055* (2013.01); *H04L 5/14* (2013.01); *H04L 5/1438* (2013.01); *H04L 12/189* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 72/04* (2013.01); *H04W 72/042* (2013.01); *H04W 72/0406* (2013.01);

(Continued)

(58) Field of Classification Search
USPC ........... 370/232, 235, 312, 328, 329; 455/450
See application file for complete search history.

(56) References Cited

U.S. PATENT DOCUMENTS

| | | |
|---|---|---|
| 2007/0064729 A1 | 3/2007 | Rodrigo et al. |
| 2009/0052420 A1 | 2/2009 | Fischer |

(Continued)

FOREIGN PATENT DOCUMENTS

WO   WO-2013138048 A1   9/2013

OTHER PUBLICATIONS

"International Application Serial No. PCT/US2013/027350, International Preliminary Report on Patentability mailed Sep. 25, 2014", 7 pgs.

(Continued)

*Primary Examiner* — Gregory Sefcheck
*Assistant Examiner* — Jael Ulysse
(74) *Attorney, Agent, or Firm* — Schwegman Lundberg & Woessner, P.A.

(57) ABSTRACT

Described herein is a technique for aggregating background traffic packets by the background users instead of performing a random access procedure to request an uplink resource for each new packet. Since the same physical random access channel (PRACH) resources are used for random access procedures by multiple UEs, collisions can occur. The PRACH is expected to operate with very low collision rates, but if the number of users increases, the collision rate increases as well as the error rate. The disclosed technique reduces the collision rate by reducing the number of random access procedures used to transmit background traffic.

24 Claims, 3 Drawing Sheets

(51) Int. Cl.

| | | |
|---|---|---|
| H04W 24/00 | (2009.01) | |
| H04W 24/02 | (2009.01) | |
| H04N 21/258 | (2011.01) | |
| H04N 21/414 | (2011.01) | |
| H04N 21/6405 | (2011.01) | |
| H04N 21/6408 | (2011.01) | |
| H04W 4/06 | (2009.01) | |
| H04L 5/00 | (2006.01) | |
| H04L 12/18 | (2006.01) | |
| H04L 29/06 | (2006.01) | |
| H04W 28/02 | (2009.01) | |
| H04L 1/18 | (2006.01) | |
| H04W 52/14 | (2009.01) | |

(52) U.S. Cl.
CPC .......... *H04W 72/048* (2013.01); *H04W 72/082* (2013.01); *H04W 72/1205* (2013.01); *H04W 76/048* (2013.01); *H04W 52/0229* (2013.01); *H04W 52/143* (2013.01); *H04W 72/0446* (2013.01); *Y02B 60/50* (2013.01)

(56) References Cited

U.S. PATENT DOCUMENTS

| | | | |
|---|---|---|---|
| 2009/0186624 A1* | 7/2009 | Cave et al. | 455/450 |
| 2009/0201898 A1 | 8/2009 | Gong et al. | |
| 2009/0204862 A1* | 8/2009 | Chun et al. | 714/748 |
| 2009/0232059 A1* | 9/2009 | Sundberg et al. | 370/329 |
| 2010/0172299 A1* | 7/2010 | Fischer et al. | 370/328 |
| 2010/0265896 A1* | 10/2010 | Park et al. | 370/329 |
| 2011/0019557 A1 | 1/2011 | Hassan et al. | |
| 2011/0058539 A1 | 3/2011 | Baker et al. | |
| 2011/0075623 A1* | 3/2011 | Venkatachalam et al. | 370/329 |
| 2011/0085509 A1* | 4/2011 | Park et al. | 370/329 |
| 2011/0194478 A1* | 8/2011 | Lee et al. | 370/312 |
| 2012/0039263 A1* | 2/2012 | Moberg et al. | 370/329 |
| 2012/0127930 A1* | 5/2012 | Nguyen et al. | 370/329 |
| 2013/0163430 A1* | 6/2013 | Gell et al. | 370/235 |
| 2013/0176953 A1* | 7/2013 | Stern-Berkowitz et al. | 370/329 |

OTHER PUBLICATIONS

"International Application Serial No. PCT/US2013/027350, International Search Report mailed May 30, 2013", 3 pgs.

"International Application Serial No. PCT/US2013/027350, Written Opinion mailed May 30, 2013", 5 pgs.

\* cited by examiner

RANDOM ACCESS CHANNEL ENHANCEMENTS FOR LTE DEVICES

PRIORITY CLAIM

This application claims the benefit of priority under 35 U.S.C. 119(e) to U.S. Provisional Patent Application Ser. No. 61/612,188, filed on Mar. 16, 2012, which is incorporated herein by reference in its entirety.

BACKGROUND

LTE (Long Term Evolution) cellular systems, as set forth in the LTE specifications of the 3rd Generation Partnership Project (3GPP), provide for four different quality of service (QoS) classes, referred to as traffic classes. They are conversational class, streaming class, interactive class, and background class. The main distinguishing factor between these QoS classes is how delay sensitive the traffic is. Conversational class is meant for traffic which is very delay sensitive while background class is the most delay insensitive traffic class.

In LTE systems, a mobile terminal, referred to as user equipment (UE), initially acquires uplink (UL) resources from the base station, referred to as an evolved node B (eNB) for transmitting data by performing a random access (RA) procedure using the physical random access channel (PRACH). The PRACH is a specific set of time-frequency resources allocated by eNB for use by UEs in performing the RA procedure. If periodic scheduling request (SR) resources are not allocated to the UE by the network, the random access process is also used by the UE to acquire uplink resources for all subsequent data transmission.

PRACH resources are shared among users who are in connected mode as well as users who are in idle mode. Since the same PRACH resources are used for random access procedure by multiple UEs, collisions can occur. The PRACH is expected to operate with very low collision rates, but if the number of users increases, the collision rate increases as well as the error rate. The LTE standard specifies a back-off mechanism for preamble retransmission for general users in order to avoid further collisions, but there is no solution specific to users running background traffic. As noted above, background traffic is different in the sense that it does not have a stringent latency requirement and has relatively very small packet transmissions.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Since background traffic consists of small packets with a relaxed latency requirement, disclosed herein is a technique for aggregating background traffic packets by the background users instead of performing an RA procedure to request an UL resource for each new packet. An example embodiment of the technique is as follows. The network or eNB informs the UEs which run background traffic to use a timer, referred to herein as a packet aggregation timer. When the UE acquires the value for initializing the packet aggregation timer, referred to as the packet aggregation timer initialization value, the timer is started. For new UL packet arrivals due to background traffic, the UE then aggregates or buffers all the packet arrivals for the duration of timer. Upon expiration of the timer, UL resources tier transmitting all of the buffered background packets are requested via the RA procedure. The timer is then reset with the packet aggregation timer value to begin the process again. Other embodiments and variations on this technique are discussed below.

Example LTE System

Figure 1:
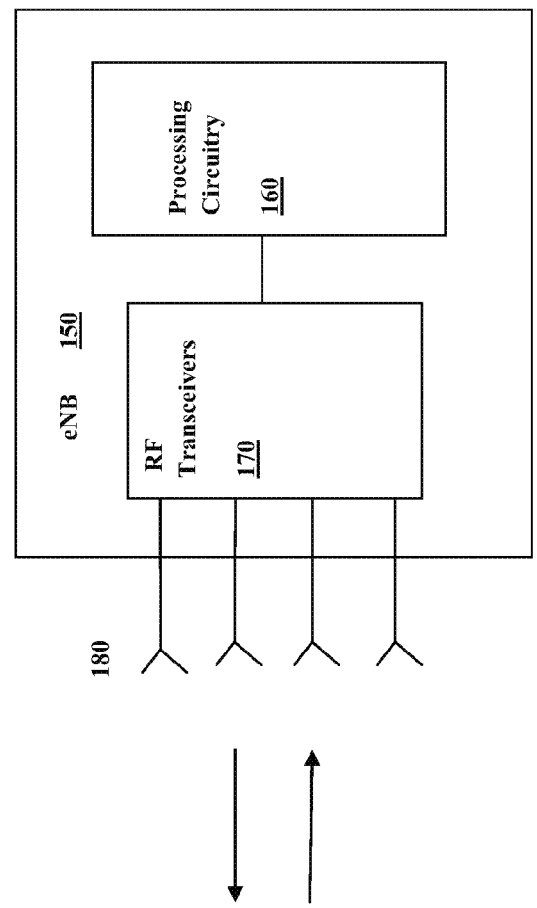
FIG. 1 illustrates a UE and an eNB in accordance with some embodiments.
Figure 1:
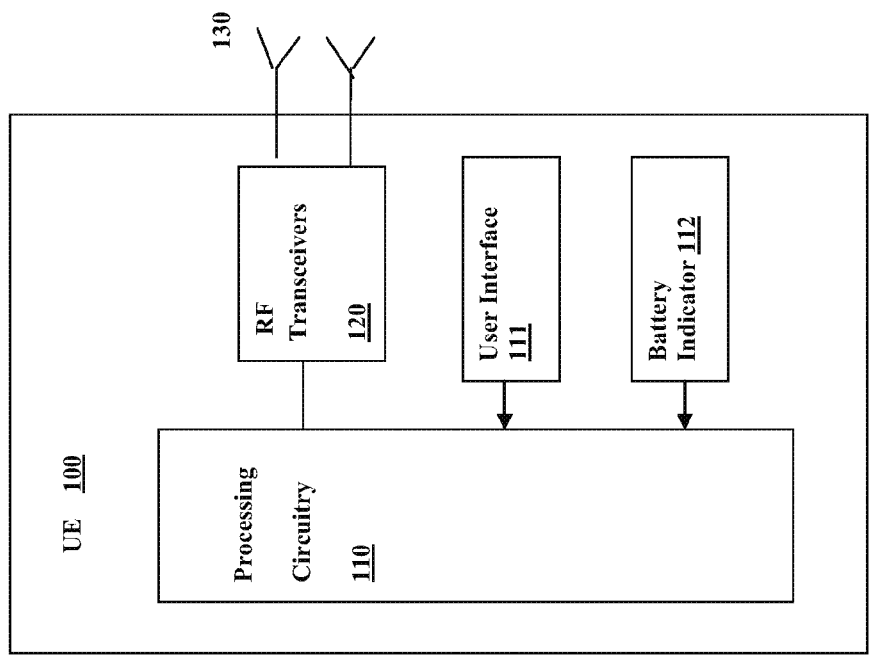

FIG. 1 shows an example of a UE 100 and an eNB 150. The UE 100 and eNB 150 incorporate processing circuitries 110 and 160, respectively, each of which is intended to represent any type of hardware/software configuration for performing the processing functions as described below. The processing circuitry 110 in the UE 100 is interfaced to one or a plurality of RF transceivers 120 that are each connected to one of a plurality of antennas 130. The processing circuitry 160 in the eNB 1150 is interfaced to a plurality of RF transceivers 170 that are each connected to one of a plurality of antennas 180. The UE 100 may be, for example, a mobile phone or other portable computing device. FIG. 1 shows a user interface 111 which could be, for example, a keyboard or touch screen. The user interface 111 enables a user of the device to communicate with the processing circuitry 110, which communication may include setting of certain parameters as discussed below. Also shown is a battery indicator 112 for indicating the charge state of a battery to the processing circuitry 110.

The physical layer of LTE is based upon orthogonal frequency division multiplexing (OFDM) for the downlink and a related technique, single carrier frequency division multiplexing (SC-FDM), for the uplink. According to the 3GPP LTE specifications, the downlink and uplink transmissions are organized into radio frames each having a duration of 10 ms. Each radio frame consists of 10 sub-frames, each sub-frame consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single slot is referred to as a resource block (RB).

When a UE is in a connected state, all uplink and downlink resources are allocated by the eNB. At the physical level, those resources are segregated into separate physical channels. The UE is allocated resources in the physical uplink control channel (PUCCH) for requesting resources for transmitting data to the eNB over the physical uplink shared channel (PUSCH). If the UE has not been allocated resources on the PUCCH for transmitting such a scheduling request, the UE may use a random access procedure for the scheduling request.

In an LTE system, specific time-frequency resources are reserved for use by UEs in performing a random access procedure, referred to as the physical random access channel (PRACH). The location of the PRACH in the time-frequency grid is broadcast to UEs in a system information block (SIB). Random access may be used by a UE for several purposes including: for initial access to establish a connection with an eNB, for transitioning from an idle state to a connected state, for establishing or re-establishing synchronization with the eNB including receiving a timing advance parameter to compensate for the time it takes for uplink transmissions to reach the eNB, and during a handover process to a new cell.

Figure 2:
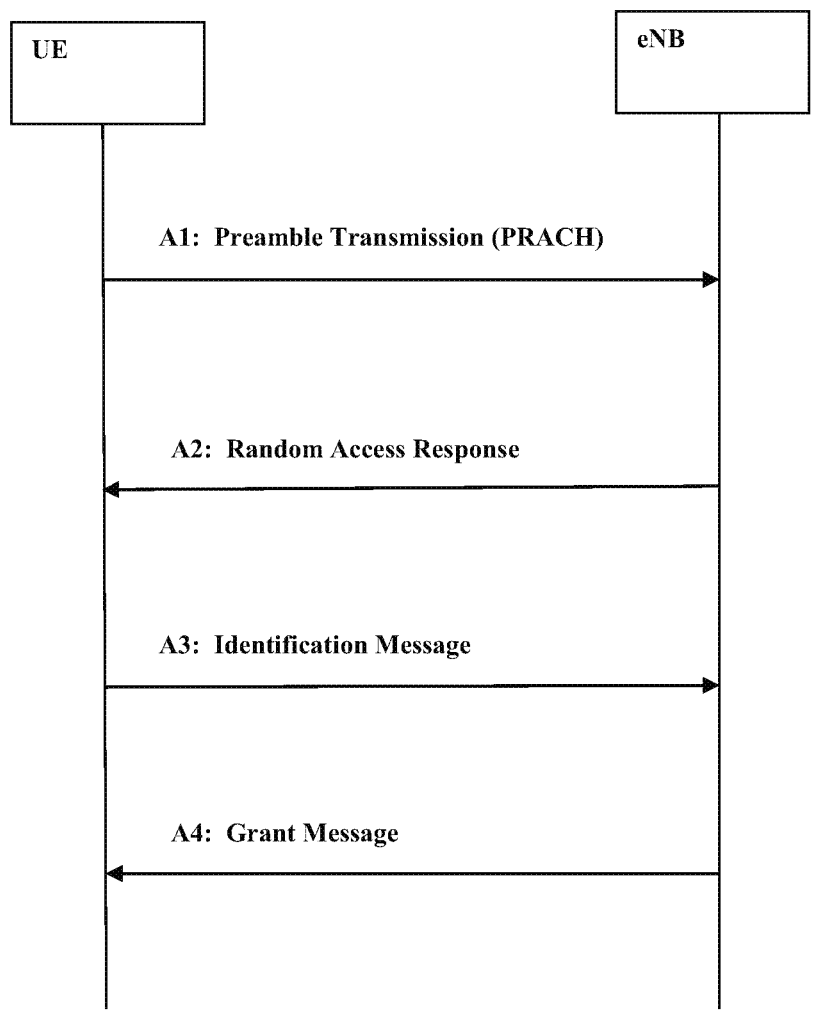
FIG. 2 illustrates the random access procedure in accordance with some embodiments.

The random access procedure begins when the mobile transmits a random access preamble on the physical random access channel (PRACH). This initiates an exchange of messages between the mobile and the base station that may be either non-contention-based or contention-based. As a result of the procedure, the mobile receives resources for uplink transmission, an initial value for the uplink timing advance and, if it does not already have one, a C-RNTI (cell-specific radio network temporary identifier) that identifies the UE and enables the UE to decode information in the physical downlink control channel (PDCCH) intended for it. FIG. 2 illustrates the steps involved in performing a contention-based RA procedure. At step A1, the UE transmits a random-access preamble using the PRACH. The preamble transmission indicates to the eNB the presence of a UE performing a random access procedure and also allows the eNB to estimate the transmission delay between the UE and eNB for adjusting the uplink timing. At step A2, the eNB transmits the random access response which includes a timing advance command to the UE to allow it to adjust the timing of its uplink transmission based on the timing estimate obtained in step A1 and also assigns uplink resources to the terminal to be used in the next step. The transmission at step A2 is over a PDSCH resource identified with a PDCCH transmission reserved for random access responses. If the eNB detects a collision due to multiple UEs attempting random access, the random access response may also include a back-off command that instructs a UE to delay before attempting random access again. At step A3, the UE transmits an identification message to the eNB using a PUSCH resource assigned to the UE by step A2. The identification message may also include a scheduling request. At step A4, the eNB transmits a grant message to the UE using the PDSCH which resolves any contention due to multiple UEs performing a random access procedure using the same preamble and receiving the same random access response from the eNB. If the random access procedure is successful, the UE is granted uplink resources. A non-contention-based random access procedure would involve only steps A1 and A2 using a dedicated preamble allocated to the UE by the eNB.

When a UE needs to transmit background traffic, a scheduling request can be transmitted over the PUCCH in order to Obtain the PUSCH resources to transmit the background traffic if the UE has been allocated PUCCH resources or such traffic can be included with other data if the UE has already been allocated PUSCH resources. If the has not been allocated such uplink resources, the random access procedure may be used. Because multiple UEs use the same PRACH resource in step A1 of the random access procedure as described above for several purposes, the repetitive use of the random access procedure for transmitting small background packets increases the probability of collisions between UEs in attempting to access the PRACH. Also, performing a multiple random access procedure for transmitting each small background packet is burdensome to a UE's limited battery power supply. The background packet aggregation technique as described herein ameliorates both of these problems.

Figure 3:
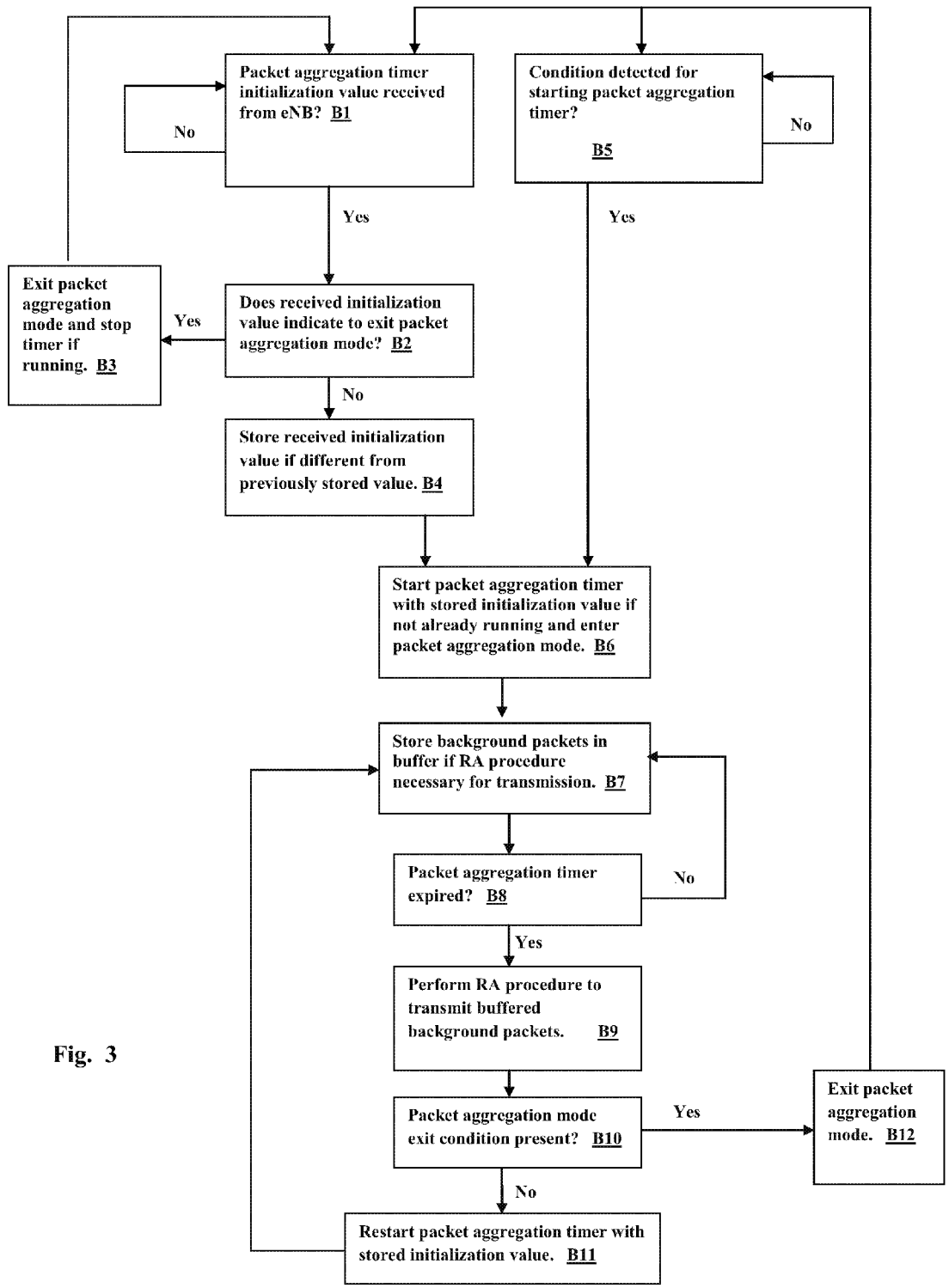
FIG. 3 illustrates an example algorithm for performing background packet aggregation in accordance with some embodiments.

An example of an algorithm that may be performed by a UE is illustrated by FIG. 3. The UE is configured to optionally operate in a background packet aggregation mode in which background packets are buffered rather than immediately transmitted using a random access procedure to request uplink resources. When in the background packet aggregation mode, the UE is inhibited from accessing the PRACH, if such access is for the purpose of transmitting background traffic, until expiration of the background packet aggregation timer, at which point the buffered packets may be transmitted using a random access procedure. At step B1, the UE checks to see if a packet aggregation tinier initialization value has been received from the eNB or other network entity. Such a received initialization value is used as a command from the eNB for the UE to enter the packet aggregation mode. In other embodiments, the command may be transmitted as some other type of message. In certain embodiments, the packet aggregation timer value or other command can be broadcast by the eNB using the master information block (MIB) or using a system information block (SIB).

If an initialization value has been received, the UE checks at step B2 to see if the received value is a command from the eNB or other network entity to exit the packet aggregation mode. Such a command may take the form of a specified initialization value (e.g., zero-valued) or an explicit command message. If an exit command is received, the UE exits the packet aggregation mode and stops the packet aggregation timer at step B3 before returning to step B1. If the received initialization value is not an exit command, the UE stores the value at step B4. In parallel with the above steps, the UE also checks to see if a condition is detected for autonomously entering the background packet aggregation mode at step B5. Such conditions may include, for example, a low battery state or an excessive level of background traffic. If either path indicates that the UE is to enter the background packet aggregation mode, the UE starts the packet aggregation timer if it is not already running and enters the background packet aggregation mode at step B6. The UE then starts (or continues) to store background packets in the aggregation buffer performing a random access procedure for their transmission at step B7. This buffering continues until the packet aggregation timer expires as determined at step B8, at which point a random access procedure is performed to transmit the buffered packets at step B9. The UE then checks if an exit condition is present for exiting the background packet aggregation mode at step B10. Such conditions could include, for example, a command from the eNB, a user command via a user input, and/or the absence of conditions for autonomously entering the packet aggregation mode if those conditions were solely responsible for the UE initiating the mode. If such exit conditions are present, the UE exits the packet aggregation mode at step B12 and returns to steps B1 and B5. Otherwise, the UE restarts the packet aggregation timer with the stored initialization value at step B11 and returns to step B7.

In an example embodiment, a device operating as a UE in an LTE network includes: an RF transceiver for providing an LTE air interface for communicating with a base station operating as an enhanced/evolved Node B (eNB); and processing circuitry interfaced to the RF transceiver and arranged to, if no uplink resources for transmitting scheduling requests to the eNB are currently allocated to the device, starting a packet aggregation timer and transmitting background packets having a relaxed latency requirement by buffering the background packets until the packet aggregation tinier expires at which point uplink resources are requested from the eNB for transmitting the buffered background packets via a random access procedure. The processing circuitry may be configured to reset the packet aggregation timer to a stored packet aggregation timer initialization value after expiration while in the packet aggregation mode. The device may be configured to optionally operate in a background packet aggregation mode, in which background packets are buffered until the packet aggregation time expires, or to not operate the background packet aggregation mode.

The processing circuitry in the example embodiment may be further arranged to: receive the packet aggregation tinier initialization value from the eNB (or other network entity) and store the received value; request a lesser packet aggregation tinier value from the eNB if the rate at which background packets are being received for transmission exceeds a specified threshold; enter the background packet aggregation mode upon receiving a positive packet aggregation timer initialization value from the eNB; exit the background packet aggregation mode upon receiving a command to do so from the eNB, where the command from the eNB to exit the packet aggregation mode may be a specified packet aggregation timer initialization value; enter the background packet aggregation mode upon receipt of a user command via a user input; request uplink resources from the eNB for transmitting the buffered background packets prior to expiration of the packet aggregation timer if the number of background packets that have been buffered exceeds a specified threshold; when operating in the packet aggregation mode, restart the packet aggregation timer if a new packet aggregation timer initialization value is received from the eNB; receive the packet aggregation timer initialization value in a master information block (MIB) or a system information block (SIB) sent by the eNB; and/or enter the background packet aggregation mode if the rate at which random access procedures are being performed for transmitting background traffic exceeds a specified threshold. The device of the example embodiment may also include a battery charge indicator with the processing circuitry being configured to enter the background packet aggregation mode if the battery charge indicator indicates a low power state.

In other modifications to the embodiments described above, the background packet aggregation buffer may be emptied prior to expiration of the background packet aggregation timer even while in the background packet aggregation mode if certain conditions are met. For example, the UE may transmit the buffered background packets via a random access procedure prior to expiration of the packet aggregation timer if the number of background packets that have been buffered exceeds a specified threshold. In another example, the buffered packets may be transmitted prior to expiration of the background packet aggregation timer while in the background packet aggregation mode if uplink resources are allocated to the UE for some other reason.

The embodiments as described above may be implemented in various hardware configurations that may include a processor for executing instructions that perform the techniques described. Such instructions may be contained in a suitable storage medium from which they are transferred to a memory or other processor-executable medium.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A device operating as user equipment (UE) in a Long Term Evolution LTE network, comprising:
    an RF transceiver for providing an LTE air interface for communicating with a base station operating as an enhanced/evolved Node B (eNB);
    processing circuitry interfaced to the RF transceiver and arranged to, when not connected to the eNB so that no PUCCH (physical uplink control channel) resources have been allocated for transmitting scheduling requests and when a packet aggregation mode is entered:
    start a packet aggregation timer;
    inhibit the UE from transmitting on a physical random access channel (PRACH) for the purpose of transmitting uplink packets having a relaxed latency requirement, referred to as background packets, until expiration of the packet aggregation timer;
    buffer the background packets; and,
    upon expiration of the packet aggregation timer, request uplink resources from the eNB via a random access procedure to transmit the buffered packets.

2. The device of claim 1, wherein the processing circuitry is arranged to reset the packet aggregation timer to a stored packet aggregation timer initialization value after expiration.

3. The device of claim 2, wherein the processing circuitry is to receive the packet aggregation timer initialization value from the eNB and store the received value.

4. The device of claim 3, wherein the processing circuitry is configured to request a lesser packet aggregation timer initialization value from the eNB if a rate at which background packets are being received for transmission exceeds a specified threshold.

5. The device of claim 3, wherein the processing circuitry is to enter a background packet aggregation mode in which background packets are buffered upon receiving a positive packet aggregation timer initialization value from the eNB.

6. The device of claim 5, wherein the processing circuitry is to exit the background packet aggregation mode upon receiving a command to do so from the eNB.

7. The device of claim 6, wherein the command from the eNB to exit the background packet aggregation mode is a zero packet aggregation timer initialization value.

8. The device of claim 1, wherein the processing circuitry is to enter a background packet aggregation mode in which background packets are buffered if a rate at which random access procedures are being performed for transmitting background traffic exceeds a specified threshold.

9. The device of claim 1, further comprising:
a battery charge indicator; and
wherein the processing circuitry is to enter a background packet aggregation mode in which background packets are buffered if the battery charge indicator indicates a low power state.

10. The device of claim 1, wherein the processing circuitry is to enter a background packet aggregation mode in which background packets are buffered upon receipt of a user command via a user input.

11. The device of claim 1, wherein the processing circuitry is to request uplink resources from the eNB for transmitting the buffered background packets prior to expiration of the packet aggregation timer if the number of background packets that have been buffered exceeds a specified threshold.

12. The device of claim 3, wherein the processing circuitry is to restart the packet aggregation timer if a new packet aggregation timer initialization value is received from the eNB.

13. The device of claim 3, wherein the processing circuitry is to receive the packet aggregation timer initialization value in a master information block (MIB) sent by the eNB.

14. The device of claim 3, wherein the processing circuitry is to receive the packet aggregation timer initialization value in a system information block (SIB) sent by the eNB.

15. A method for operating user equipment (UE) in a Long Term Evolution LTE network, comprising:
if a packet aggregation mode is enabled and the UE is not connected to the eNB so that no PUCCH (physical uplink control channel) resources have been allocated for transmitting scheduling requests to the eNB:
inhibiting the UE from transmitting on a physical random access channel (PRACH) for the purpose of transmitting uplink packets having a relaxed latency requirement, referred to as background packets, until expiration of the packet aggregation timer,
starting a packet aggregation timer;
buffering the background packets;
upon expiration of the packet aggregation timer, requesting uplink resources from the eNB for transmitting the buffered background packets via a random access procedure and transmitting the buffered background packets on the allocated uplink resources.

16. The method of claim 15, further comprising resetting the packet aggregation timer to a stored packet aggregation timer initialization value after expiration.

17. The method of claim 16, further comprising receiving the packet aggregation timer initialization value from an eNB and storing the received value.

18. The device of claim 15, further comprising entering the background packet aggregation mode if the rate at which random access procedures are being performed for transmitting background traffic exceeds a specified threshold.

19. The device of claim 15, further comprising entering the background packet aggregation mode if the battery charge indicator indicates a low power state.

20. The device of claim 15, further comprising entering the background packet aggregation mode upon receipt of a user command via a user input.

21. The device of claim 15, further comprising, if the background packet aggregation mode is enabled, requesting uplink resources from the eNB for transmitting the buffered background packets prior to expiration of the packet aggregation timer if the number of background packets that have been buffered exceeds a specified threshold.

22. A method for operating an evolved node B (eNB) in an LTE network, comprising:
detecting a collision rate among UEs in accessing the physical random access channel (PRACH); and
if the detected collision rate exceeds a specified threshold, transmitting a command to user equipment (UE) that the UEs enter a background packet aggregation mode in which the UEs are configured to, when not connected to the eNB so that no PUCCH (physical uplink control channel) resources have been allocated for transmitting scheduling requests and when a packet aggregation mode is entered:
start a packet aggregation timer:
inhibit the UE from transmitting on a physical random access channel (PRACH) for the purpose of transmitting uplink packets having a relaxed latency requirement, referred to as background packets, until expiration of the packet aggregation timer;
buffer the background packets; and,
upon expiration of the packet aggregation timer, request uplink resources from the eNB via a random access procedure to transmit the buffered packets.

23. The method of claim 22, further comprising transmitting the command to enter the background packet aggregation mode in a master information block (MIB).

24. The method of claim 22, further comprising transmitting the command to enter the background packet aggregation mode in a system information block (SIB).

* * * * *